US012640973B2

(12) United States Patent
Suresh et al.

(10) Patent No.: US 12,640,973 B2
(45) Date of Patent: May 26, 2026

(54) CONFIGURABLE MODULATION SCHEMES AT A WIRELESS DEVICE

(71) Applicant: QUALCOMM Incorporated, San Diego, CA (US)

(72) Inventors: Vinayak Suresh, San Diego, CA (US); Juergen Cezanne, Ocean Township, NJ (US); Jing Jiang, San Diego, CA (US); Kapil Gulati, Belle Mead, NJ (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 18/823,354

(22) Filed: Sep. 3, 2024

(65) Prior Publication Data

US 2026/0067148 A1 Mar. 5, 2026

(51) Int. Cl.
*H04L 27/26* (2006.01)
(52) U.S. Cl.
CPC ............................... *H04L 27/2627* (2013.01)
(58) Field of Classification Search
CPC ......... H04B 7/0452; H04B 7/06; H04J 13/00; H04L 1/00; H04L 5/00; H04L 27/20;
(Continued)

(56) References Cited

U.S. PATENT DOCUMENTS

2020/0266947 A1    8/2020    Noh et al.
2024/0014922 A1 *  1/2024    Liu ........................ H04L 1/0009
(Continued)

OTHER PUBLICATIONS

International Search Report and Written Opinion—PCT/US2025/040497—ISA/EPO—Dec. 8, 2025.

*Primary Examiner* — Shawkat M Ali
(74) *Attorney, Agent, or Firm* — Holland & Hart LLP

(57) ABSTRACT

Methods, systems, and devices for wireless communications are described. The described techniques provide for a user equipment (UE) to communicate using $$\frac{\pi}{2}$$

binary phase shift keying (BPSK) modulation according to extended coding rates. In some cases, the UE may receive configuration information that supports modulation orders for $$\frac{\pi}{2}BPSK$$

modulation extended to include modulation orders otherwise only configured for quadrature phase shift keying (QPSK) modulation. Further, the UE may support dynamic switching between $$\frac{\pi}{2}BPSK$$

and QPSK modulation. For example, the UE may transmit or receive control signaling indicating a modulation order for an uplink transmission, where the UE or a network entity may determine which modulation scheme and order to use according to communication parameters associated with the uplink transmission, the UE, or both.

20 Claims, 8 Drawing Sheets

Receive configuration information indicating modulation information for transmitting a discrete Fourier transform-spread-orthogonal frequency division multiplexing (DFT-s-OFDM) waveform to a network entity, the configuration information indicating a π/2 binary phase shift keying (BPSK) modulation scheme and a first set of modulation orders corresponding to the π/2 BPSK modulation scheme and indicating a quadrature phase shift keying (QPSK) modulation scheme and a second set of modulation orders corresponding to the QPSK modulation scheme

805

Transmit the DFT-s-OFDM waveform to the network entity in accordance with the π/2 BPSK modulation scheme and a modulation order of the second set of modulation orders, where a first coding rate associated with the modulation order of the second set of modulation orders is higher than one or more second coding rates associated with the first set of modulation orders

810

800

(58) Field of Classification Search
    CPC ..... H04L 27/26; H04L 27/34; H04L 27/2627;
            H04W 28/06; H04W 36/00; H04W 52/36;
            H04W 72/04; H04W 72/10; H04W 76/27
    USPC ........ 375/219, 260, 262, 267, 295, 308, 316
    See application file for complete search history.

(56)                References Cited

U.S. PATENT DOCUMENTS

2024/0121025  A1*   4/2024  Zhang ................... H04L 1/0016
2025/0254079  A1*   8/2025  Dang .................. H04W 52/367

* cited by examiner

Figure 8:
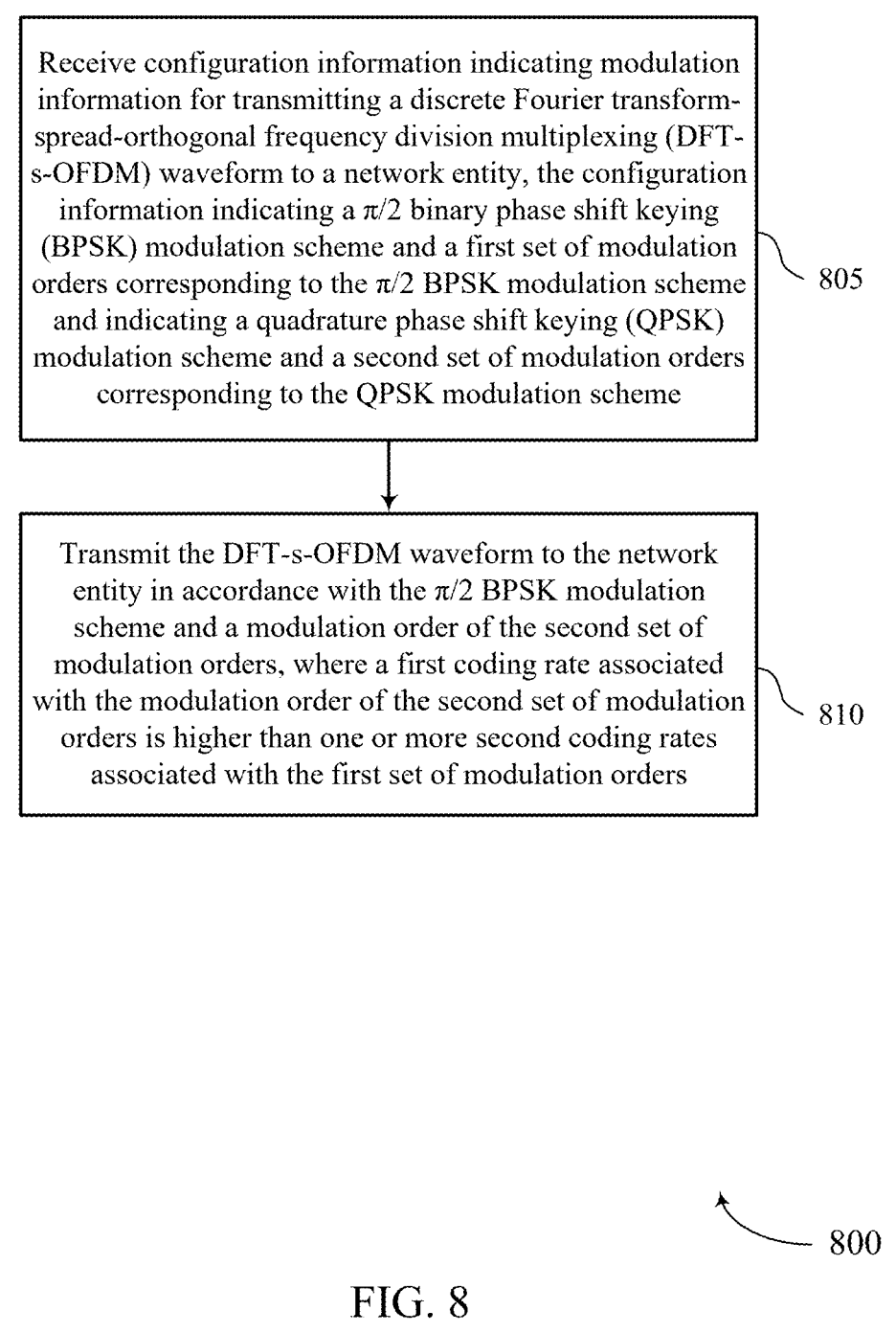

Receive configuration information indicating modulation information for transmitting a discrete Fourier transform-spread-orthogonal frequency division multiplexing (DFT-s-OFDM) waveform to a network entity, the configuration information indicating a $\pi/2$ binary phase shift keying (BPSK) modulation scheme and a first set of modulation orders corresponding to the $\pi/2$ BPSK modulation scheme and indicating a quadrature phase shift keying (QPSK) modulation scheme and a second set of modulation orders corresponding to the QPSK modulation scheme

805

Transmit the DFT-s-OFDM waveform to the network entity in accordance with the $\pi/2$ BPSK modulation scheme and a modulation order of the second set of modulation orders, where a first coding rate associated with the modulation order of the second set of modulation orders is higher than one or more second coding rates associated with the first set of modulation orders

CONFIGURABLE MODULATION SCHEMES AT A WIRELESS DEVICE

TECHNICAL FIELD

The following relates to wireless communications, including configurable modulation schemes at a wireless device.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communications by a user equipment (UE) is described. The method may include receiving configuration information indicating modulation information for transmitting a discrete Fourier transform-spread-orthogonal frequency division multiplexing (DFT-s-OFDM) waveform to a network entity, the configuration information indicating a π/2 binary phase shift keying (BPSK) modulation scheme and a first set of modulation orders corresponding to the π/2 BPSK modulation scheme and indicating a quadrature phase shift keying (QPSK) modulation scheme and a second set of modulation orders corresponding to the QPSK modulation scheme and transmitting the DFT-s-OFDM waveform to the network entity in accordance with the π/2 BPSK modulation scheme and a modulation order of the second set of modulation orders, where a first coding rate associated with the modulation order of the second set of modulation orders is higher than one or more second coding rates associated with the first set of modulation orders.

A UE for wireless communications is described. The UE may include one or more memories storing processor executable code, and one or more processors coupled with the one or more memories. The one or more processors may individually or collectively be operable to execute the code to cause the UE to receive configuration information indicating modulation information for transmitting a DFT-s-OFDM waveform to a network entity, the configuration information indicating a π/2 BPSK modulation scheme and a first set of modulation orders corresponding to the π/2 BPSK modulation scheme and indicating a QPSK modulation scheme and a second set of modulation orders corresponding to the QPSK modulation scheme and transmit the DFT-s-OFDM waveform to the network entity in accordance with the π/2 BPSK modulation scheme and a modulation order of the second set of modulation orders, where a first coding rate associated with the modulation order of the second set of modulation orders is higher than one or more second coding rates associated with the first set of modulation orders.

Another UE for wireless communications is described. The UE may include means for receiving configuration information indicating modulation information for transmitting a DFT-s-OFDM waveform to a network entity, the configuration information indicating a π/2 BPSK modulation scheme and a first set of modulation orders corresponding to the π/2 BPSK modulation scheme and indicating a QPSK modulation scheme and a second set of modulation orders corresponding to the QPSK modulation scheme and means for transmitting the DFT-s-OFDM waveform to the network entity in accordance with the π/2 BPSK modulation scheme and a modulation order of the second set of modulation orders, where a first coding rate associated with the modulation order of the second set of modulation orders is higher than one or more second coding rates associated with the first set of modulation orders.

A non-transitory computer-readable medium storing code for wireless communications is described. The code may include instructions executable by one or more processors to receive configuration information indicating modulation information for transmitting a DFT-s-OFDM waveform to a network entity, the configuration information indicating a π/2 BPSK modulation scheme and a first set of modulation orders corresponding to the π/2 BPSK modulation scheme and indicating a QPSK modulation scheme and a second set of modulation orders corresponding to the QPSK modulation scheme and transmit the DFT-s-OFDM waveform to the network entity in accordance with the π/2 BPSK modulation scheme and a modulation order of the second set of modulation orders, where a first coding rate associated with the modulation order of the second set of modulation orders is higher than one or more second coding rates associated with the first set of modulation orders.

In some examples of the method, UEs, and non-transitory computer-readable medium described herein, the configuration information includes a modulation and coding scheme (MCS) table and the first set of modulation orders may be associated with a first set of indices of the MCS table and the second set of modulation orders may be associated with a second set of indices of the MCS table.

In some examples of the method, UEs, and non-transitory computer-readable medium described herein, at least a portion of the second set of indices overlap, within the MCS table, with the first set of indices and the first set of indices and the second set of indices include separate indices within the MCS table.

Some examples of the method, UEs, and non-transitory computer-readable medium described herein may further include operations, features, means, or instructions for receiving control signaling indicating to use the π/2 BPSK modulation scheme and the modulation order of the second set of modulation orders, where transmitting the DFT-s-OFDM waveform in accordance with the π/2 BPSK modulation scheme and the modulation order of the second set of modulation orders may be based on receiving the control signaling.

Some examples of the method, UEs, and non-transitory computer-readable medium described herein may further include operations, features, means, or instructions for using the $\pi/2$ BPSK modulation scheme and the modulation order of the second set of modulation orders may be based on one or more communication parameters associated with the DTF-s-OFDM waveform, the UE, or both.

In some examples of the method, UEs, and non-transitory computer-readable medium described herein, the one or more communication parameters include a resource block allocation location associated with the DTF-s-OFDM waveform, a power class of the UE, an available power headroom of the UE, a maximum permissible exposure threshold associated with the DTF-s-OFDM waveform, a specific absorption rate associated with the DTF-s-OFDM waveform, a signal-to-noise ratio operating point associated with the UE, or any combination thereof.

In some examples of the method, UEs, and non-transitory computer-readable medium described herein, the control signaling indicates a modulation order index associated with the modulation order, an indication of whether to use a coding rate of the modulation order that may be associated with the $\pi/2$ BPSK modulation scheme, or both.

Some examples of the method, UEs, and non-transitory computer-readable medium described herein may further include operations, features, means, or instructions for selecting, by the UE, the $\pi/2$ BPSK modulation scheme and the modulation order of the second set of modulation orders to use for transmitting the DTF-s-OFDM waveform based on one or more communication parameters associated with the DFT-s-OFDM waveform, the UE, or both, where transmitting the DFT-s-OFDM waveform in accordance with the $\pi/2$ BPSK modulation scheme and the modulation order of the second set of modulation orders may be based on the selection and transmitting, to the network entity, control signaling indicating the selection of the $\pi/2$ BPSK modulation scheme and the modulation order of the second set of modulation orders.

In some examples of the method, UEs, and non-transitory computer-readable medium described herein, the control signaling includes an uplink control information message that may be multiplexed with the DFT-s-OFDM waveform.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 8 shows a flowchart illustrating methods that support configurable modulation schemes at a wireless device in accordance with one or more aspects of the present disclosure.

DETAILED DESCRIPTION

Figure 1:
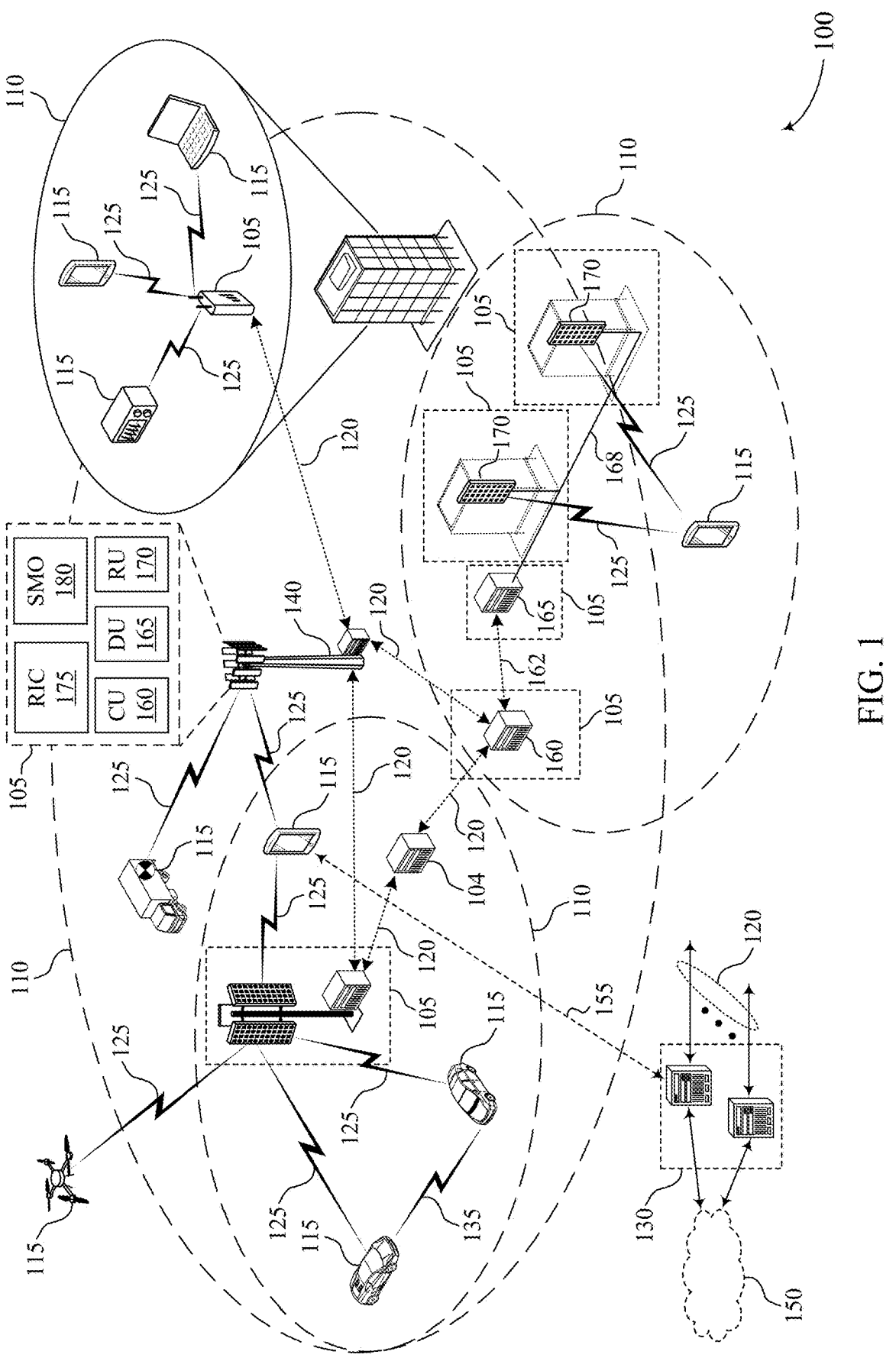
FIG. 1 shows an example of a wireless communications system that supports configurable modulation schemes at a wireless device in accordance with one or more aspects of the present disclosure.

A user equipment (UE) may communicate with a network entity using a waveform configuration and a modulation scheme to encode data in an uplink transmission. For example, the UE may transmit a discrete Fourier transform (DTF)-spread-orthogonal frequency division multiplexed (DFT-s-OFDM) waveform to the network entity, which may reduce a peak to average power ratio (PAPR) associated with transmitting data to the network entity. In some cases, the UE may apply one or more modulation and coding (MCS) schemes to the DFT-s-OFDM waveform to support encoding the bits. For example, the UE may apply quadrature phase shift keying (QPSK) to the waveform (e.g., to improve signal robustness and transmission capacity) or may apply binary phase shift keying (BPSK) to the waveform (e.g., to further reduce PAPR) to encode data transmitted via the DFT-s-OFDM waveform. In some examples, a modulation order associated with the modulation scheme for a DFT-s-OFDM waveform may indicate a coding rate of the modulation scheme (e.g., where a relatively higher modulation order may indicate a relatively higher coding rate). For example, due to a QPSK modulation scheme indicating multiple bits of information per symbol, modulation orders configured for QPSK may extend higher than modulation orders configured for $$\frac{\pi}{2} BPSK.$$

In some cases, extending the coding rates available for $$\frac{\pi}{2} BPSK$$

may be preferable to transmitting at higher coding rates using QPSK, such as when the UE has available power headroom, among other examples. However, the UE may be unable to support such higher coding rates for $$\frac{\pi}{2} BPSK$$

modulation or otherwise may be unable to switch between modulation schemes dynamically (e.g., without a radio resource control (RRC) reconfiguration), which may reduce communication performance of the UE.

Techniques described herein provide for a UE to communicate using $$\frac{\pi}{2}BPSK$$

modulation according to extended coding rates. In some cases, the UE may receive configuration information that supports modulation orders for $$\frac{\pi}{2}BPSK$$

modulation extended to include modulation orders otherwise only configured for QPSK modulation. For example, the UE may receive an MCS table that includes overlapping entries (e.g., entries where the coding rate may be applied to either $$\frac{\pi}{2}BPSK$$

or QPSK according to a scaling factor) or separate entries for modulation orders applicable to $$\frac{\pi}{2}BPSK$$

and QPSK, where the entries corresponding to $$\frac{\pi}{2}BPSK$$

modulation may extend to relatively higher coding rates (e.g., modulation index 6 or greater). Further, the UE may support dynamic switching between $$\frac{\pi}{2}BPSK$$

and QPSK modulation. For example, the UE may receive control signaling (e.g., a downlink control information (DCI) message) indicating a modulation order for the UE to use for a DFT-s-OFDM waveform, where the network entity may determine which modulation scheme and order to use according to communication parameters. If the $$\frac{\pi}{2}BPSK$$

and QPSK entries are configured to overlap, the control signaling may additionally include an indication of whether the coding rate of the modulation order is associated with $$\frac{\pi}{2}BPSK$$

or QPSK. Alternatively, the UE may select between $$\frac{\pi}{2}BPSK$$

and QPSK modulation for transmitting an uplink DFT-s-OFDM waveform (e.g., a scheduled physical uplink shared channel (PUSCH) transmission) according to communication parameters. Such techniques improve communication performance by the UE by adapting modulation dynamically and improving modulation flexibility.

Aspects of the disclosure are initially described in the context of wireless communications systems and a process flow. Aspects of the disclosure are further illustrated by and described with reference to apparatus diagrams, system diagrams, and flowcharts that relate to configurable modulation schemes at a wireless device.

FIG. 1 shows an example of a wireless communications system 100 that supports configurable modulation schemes at a wireless device in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and Ne may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some examples of the wireless communications system 100, a UE 115 may communicate with a network entity 105 using a waveform configuration and a modulation scheme to encode data in an uplink transmission. For example, the UE 115 may transmit a DFT-s-OFDM waveform to the network entity 105, which may reduce a PAPR associated with transmitting data to the network entity 105. In some cases, the UE 115 may apply one or more MCSs to the DFT-s-OFDM waveform to support encoding the bits. For example, the UE 115 may apply QPSK modulation to the waveform (e.g., to improve signal robustness) or may apply $$\frac{\pi}{2}BPSK$$

modulation to the waveform (e.g., to further reduce PAPR) to encode data transmitted via the DFT-s-OFDM waveform. In some examples, a modulation order associated with the modulation scheme for a DFT-s-OFDM waveform may indicate a coding rate of the modulation scheme (e.g., where a relatively higher modulation order may indicate a relatively higher coding rate). For example, due to a QPSK modulation scheme indicating multiple bits of information per symbol, modulation orders configured for QPSK may extend higher than modulation orders configured for $$\frac{\pi}{2}BPSK.$$

In some cases, using $$\frac{\pi}{2}BPSK$$

modulation at a higher coding rate may be preferable to using QPSK, such as when the UE 115 has available power headroom, among other examples. However, the UE 115 may be unable to support such higher coding rates for $$\frac{\pi}{2}BPSK$$

modulation or otherwise may be unable to switch between modulation schemes dynamically (e.g., without a RRC reconfiguration), which may reduce communication performance of the UE 115.

Techniques described herein provide for a UE to communicate using $$\frac{\pi}{2}BPSK$$

modulation according to extended coding rates. In some cases, the UE may receive configuration information that supports modulation orders for $$\frac{\pi}{2}BPSK$$

modulation extended to include modulation orders otherwise only configured for QPSK modulation. For example, the UE may receive an MCS table that includes overlapping entries (e.g., entries where the coding rate may be applied to either $$\frac{\pi}{2}BPSK$$

or QPSK according to a scaling factor) or separate entries for modulation orders applicable to $$\frac{\pi}{2}BPSK$$

and QPSK, where the entries corresponding to $$\frac{\pi}{2}BPSK$$

modulation may extend to relatively higher coding rates (e.g., modulation index 6 or greater). Further, the UE may support dynamic switching between $$\frac{\pi}{2}BPSK$$

and QPSK modulation. For example, the UE may receive control signaling (e.g., a downlink control information (DCI) message) indicating a modulation order for the UE to use for a DFT-s-OFDM waveform, where the network entity may determine which modulation scheme and order to use according to communication parameters. If the $$\frac{\pi}{2}BPSK$$

and QPSK entries are configured to overlap, the control signaling may additionally include an indication of whether the coding rate of the modulation order is associated with $$\frac{\pi}{2}BPSK$$

or QPSK. Alternatively, the UE may select between $$\frac{\pi}{2}BPSK$$

and QPSK modulation for transmitting an uplink DFT-s-OFDM waveform (e.g., a scheduled physical uplink shared channel (PUSCH) transmission) according to communication parameters. Such techniques improve communication performance by the UE by adapting modulation dynamically and improving modulation flexibility.

Figure 2:
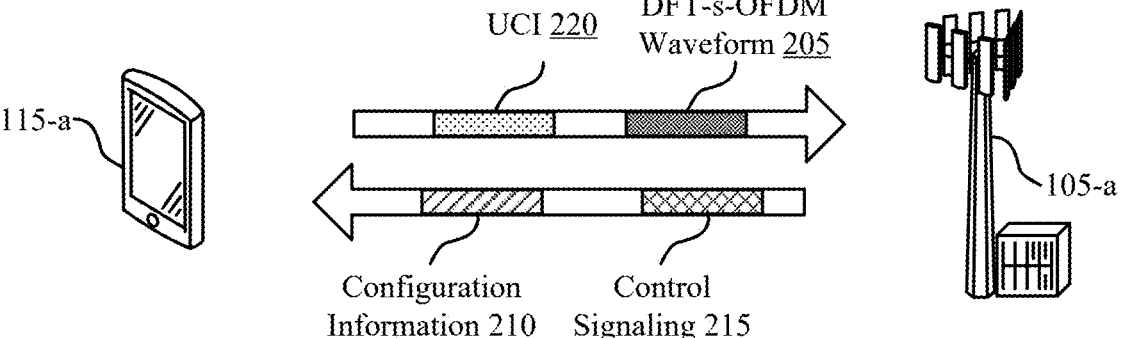
FIG. 2 shows an example of a wireless communications system that supports configurable modulation schemes at a wireless device in accordance with one or more aspects of the present disclosure.

FIG. 2 shows an example of a wireless communications system 200 that supports configurable modulation schemes at a wireless device in accordance with one or more aspects of the present disclosure. The wireless communications system 200 may implement, or be implemented by, one or more aspects of the wireless communications system 100. For example, the wireless communications system 200 illustrates signaling and operations of a UE 115-a and a network entity 105-a, which may be examples of corresponding devices described with reference to FIG. 1. In some cases, the wireless communications system 200 may support the UE 115-a communicating a DFT-s-OFDM waveform according to one or more modulation schemes (e.g., $$\frac{\pi}{2}BPSK$$

modulation and QPSK modulation).

In some cases, the UE 115-a communicate uplink signaling to the network entity 105-a using a DFT-s-OFDM waveform 205. For example, the UE 115-a may determine to use the DFT-s-OFDM waveform 205 to reduce a PAPR of an uplink transmission (e.g., reduced PAPR in comparison to other OFDM waveforms, such as a cyclic prefix (CP)-OFDM waveform). Reducing the PAPR may improve power amplifier efficiency at the UE 115-a and may allow the UE 115-a to operate one or more power amplifiers near a saturation power of the one or more power amplifiers (e.g., improving coverage).

Additionally, the UE 115-a may modulate the DFT-s-OFDM waveform 205 in order to encode data transmitted via the DFT-s-OFDM waveform 205. For example, the UE 115-a may be configured to apply $$\frac{\pi}{2}BPSK$$

modulation to the DFT-s-OFDM waveform 205. The $$\frac{\pi}{2}BPSK$$

modulation may enable the UE 115-a to communicate one bit of information per symbol transmitted via the DFT-s-OFDM waveform with improved reliability (e.g., including a-phase shift per symbol may decrease error when communicating repetitions of the same binary value). As another example, the UE 115-a may be configured to apply QPSK modulation to the DFT-s-OFDM waveform 205. The QPSK modulation may enable the UE 115-a to communicate two bits of information per symbol transmitted via the DFT-s-OFDM waveform (e.g., improving transmission capacity without occupying additional bandwidth). In some cases, the $$\frac{\pi}{2}BPSK$$

modulation may reduce a PAPR of the DFT-s-OFDM waveform 205, which may support the UE 115-a lowering a backoff of the DFT-s-OFDM waveform 205, for example a 2 dB backoff advantage in comparison to QPSK modulation, while meeting communication constraints (e.g., emission constraints, error vector magnitude (EVM) constraints), thereby improving uplink coverage. Additionally, or alternatively, the UE 115-a may supplement the DFT-s-OFDM waveform with a spectrum shaping filter to further reduce PAPR and improve uplink coverage. In such examples, the UE 115-a may implement the spectrum shaping filter transparently to the network entity 105-a.

In some examples, the network entity 105-a may indicate, to the UE 115-a, an MCS table that includes MCS indices associated with the $$\frac{\pi}{2}BPSK$$

modulation and the QPSK modulation. In some cases, due to the differences in transmission capacity between $$\frac{\pi}{2}BPSK$$

modulation and QPSK modulation, the modulation schemes may be associated with different coding rates for the same modulation index. For example, to indicate the same amount of information, a $$\frac{\pi}{2}BPSK$$

modulation may uc associated with a coding rate twice as high as a QPSK modulation scheme (e.g., the $$\frac{\pi}{2}BPSK$$

modulation may indicate twice the quantity of symbols than the QPSK modulation at the same modulation order).

In some cases, due to the increased coding rate associated with the $$\frac{\pi}{2}BPSK$$

modulation scheme, the network entity 105-a may limit, in the MCS table, the quantity of MCS indices that support the $$\frac{\pi}{2}BPSK$$

modulation scheme. For example, the network entity 105-a may indicate an MCS table corresponding to Table 1 below:

TABLE 1

| MCS Index | Modulation Order | Target Code Rate | Spectral Efficiency |
|---|---|---|---|
| 0 | q | 60/q | 0.0586 |
| 1 | q | 80/q | 0.0781 |

TABLE 1-continued

| MCS Index | Modulation Order | Target Code Rate | Spectral Efficiency |
|---|---|---|---|
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| . . . | . . . | . . . | . . . |

The UE 115-a may reference Table 1 to determine a modulation scheme and coding rate for transmitting the DFT-s-OFDM waveform. In some cases, some entries of the MCS table may support either of $$\frac{\pi}{2}BPSK$$

modulation and QPSK modulation. In the example illustrated by Table 1, MCS indices 0 through 5 may support either $$\frac{\pi}{2}BPSK$$

modulation or QPSK modulation according to a value of q, where q may be equal to 1 for $$\frac{\pi}{2}BPSK$$

modulation and may be equal to 2 for QPSK modulation. Further, the coding rate for the modulation may be a function of q, such that for the same modulation index and spectral efficiency, the $$\frac{\pi}{2}BPSK$$

modulation may have twice the coding rate of the QPSK modulation. In the example of Table 1, $$\frac{\pi}{2}BPSK$$

modulation may not be supported by MCS indices greater than 5, and $$\frac{\pi}{2}BPSK$$

modulation may be limited to a coding rate of approximately ⅕. In some other examples (e.g., MCS tables differing from the example of Table 1), the $$\frac{\pi}{2}BPSK$$

modulation may be limited to a coding rate of approximately ⅓.

However, in some examples, communications by the UE 115-a may be improved by modulating the DFT-s-OFDM waveform according to the $$\frac{\pi}{2}BPSK$$

modulation scheme with extended coding rates (e.g., in comparison to modulating according to QPSK modulation). For example, by applying a spectral shaping filter to the DFT-s-OFDM waveform 205, the UE 115-a may reduce the PAPR of the DFT-s-OFDM waveform 205, thereby allowing the $$\frac{\pi}{2}BPSK$$

modulation to support higher coding rates while still satisfying network constraints. In some cases, extending the coding rates for a rank 1

$$\frac{\pi}{2}BPSK$$

modulation scheme may result in a similar throughput as a rank 2

$$\frac{\pi}{2}BPSK$$

modulation scheme.

The UE 115-a may determine that using $$\frac{\pi}{2}BPSK$$

modulation with extended coding rates is advantageous over using QPSK modulation according to one or more communication parameters. For example, determining to use $$\frac{\pi}{2}BPSK$$

modulation with extended coding rates over QPSK modulation may be based on a resource block allocation for the DFT-s-OFDM waveform 205 (e.g., an edge resource block or an inner resource block), a power class of power amplifiers at the UE 115-a, an available power headroom at the UE 115-a, a specific absorption rate (SAR) associated with the DFT-s-OFDM waveform 205, a maximum permissible exposure (MPE) associated with the DFT-s-OFDM waveform 205, or any combination thereof, among other examples.

In some cases, to switch between using the $$\frac{\pi}{2}BPSK$$

modulation and the QPSK modulation, the UE 115-a may report information to the network entity 105-a via control signaling. For example, the UE 115-*a* may transmit capability reports via RRC signaling and power headroom reports via MAC-CEs to indicate communication parameters associated with the modulation schemes. However, the quantity of power headroom reports the UE 115-*a* is permitted to transmit may be limited and the RRC signaling may have relatively long latency, and the UE 115-*a* may be unable to indicate the $$\frac{\pi}{2} BPSK$$

modulation with extended coding rates is preferable in a dynamic fashion.

To support modulating the DFT-s-OFDM waveform using $$\frac{\pi}{2} BPSK$$

modulation with extended coding rates, the network entity 105-*a* may configure an MCS table to support $$\frac{\pi}{2} BPSK$$

modulation at MCS indices that are otherwise only available for QPSK modulation. For example, the network entity 105-*a* may transmit configuration information 210 to the UE 115-*a* to indicate modulation information for transmitting the DFT-s-OFDM waveform 205. The configuration information 210 may indicate the $$\frac{\pi}{2} BPSK$$

modulation scheme and the QPSK modulation scheme, and may indicate a first set of modulation orders corresponding to the $$\frac{\pi}{2} BPSK$$

modulation scheme and a second set of modulation orders corresponding to the QPSK modulation scheme. Additionally, or alternatively, the configuration information 210 may include an MCS table, where a first set of MCS indices may be associated with the first set of modulation orders and a second set of MCS indices may be associated with the second set of modulation orders. In some cases, the MCS table may support using the $$\frac{\pi}{2} BPSK$$

modulation in accordance with a modulation order of the second set of modulation orders (e.g., modulation orders associated with and otherwise configured only for QPSK modulation), which may be associated with an extended coding rate for the $$\frac{\pi}{2} BPSK$$

modulation.

As an example, the configuration information 210 may include an MCS table corresponding to Table 2 below:

TABLE 2

| MCS Index | Modulation Order | Target Code Rate | Spectral Efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | q | 240/q | 0.2344 |
| 7 | 2 | 157 | 0.3066 |
| . . . | . . . | . . . | . . . |

In the example of Table 2, the MCS table may include overlapping entries for $$\frac{\pi}{2} BPSK$$

modulation and QPSK modulation. The overlapping entries may be extended to support higher coding rates for $$\frac{\pi}{2} BPSK$$

modulation (e.g., in comparison to the MCS table of Table 1). For example, the entry of MCS index 6 may be configured to support either $$\frac{\pi}{2} BPSK$$

modulation or QPSK modulation, allowing for the UE 115-*a* to achieve higher coding rates and spectral efficiency using $$\frac{\pi}{2} BPSK$$

modulation. The MCS table may include overlapping entries for any quantity of MCS indices, and is not limited to the example shown by Table 2.

As another example, the configuration information 210 may include an MCS table corresponding to Table 3 below:

TABLE 3

| MCS Index | Modulation Order | Target Code Rate | Spectral Efficiency |
|---|---|---|---|
| 0 | 1 | 60 | 0.0586 |
| 1 | 1 | 80 | 0.0781 |
| 2 | 1 | 100 | 0.0977 |
| 3 | 1 | 128 | 0.1250 |
| . . . | . . . | . . . | . . . |
| N | 2 | 30 | 0.0586 |
| N + 1 | 2 | 80 | 0.0781 |

TABLE 3-continued

| MCS Index | Modulation Order | Target Code Rate | Spectral Efficiency |
|---|---|---|---|
| N + 2 | 2 | 100 | 0.0977 |
| N + 3 | 2 | 128 | 0.1250 |
| . . . | . . . | . . . | . . . |

In the example of Table 3, the MCS table may include separate entries for $$\frac{\pi}{2}BPSK$$

modulation and QPSK modulation. For example, the first set of indices corresponding to $$\frac{\pi}{2}BPSK$$

modulation may occupy a first quantity of entries in the MCS table (e.g., entries 0 through N−1) and the second set of indices corresponding to QPSK modulation may occupy a second quantity of entries in the MCS table separate from the first quantity of entries. The entries corresponding to $$\frac{\pi}{2}BPSK$$

modulation may occur before the entries corresponding to QPSK modulation, or vice-versa. In some cases, the first set of indices corresponding to $$\frac{\pi}{2}BPSK$$

modulation may include the extended coding rates, for example enabling the UE 115-$a$ to achieve a coding rate greater than ⅕ using $$\frac{\pi}{2}BPSK$$

modulation.

In some cases, to dynamically switch between using $$\frac{\pi}{2}BPSK$$

modulation and QPSK modulation for the DFT-s-OFDM waveform 205, the network entity 105-$a$ may transmit control signaling 215 to the UE 115-$a$ indicating a modulation scheme. For example, the control signaling 215 may be an example of a physical downlink control channel (PDCCH) transmission, such as a DCI message, that indicates whether to use $$\frac{\pi}{2}BPSK$$

modulation or QPSK modulation for the DFT-s-OFDM waveform 205. Such signaling may support the UE 115-$a$ switching between using $$\frac{\pi}{2}BPSK$$

modulation and QPSK modulation relatively quickly, particularly in comparison to switching between modulation schemes using RRC signaling (e.g., avoiding latency associated with signaling a q value via RRC signaling). In some examples, the control signaling 215 may indicate an MCS index and a q value, such as when the MCS table includes overlapping entries as described with reference to Table 2 (e.g., a relatively smaller MCS table with relatively more bits included in the DCI message). Alternatively, the control signaling 215 may indicate the MCS index without indicating the q value, such as when the MCS table includes separate entries as described with reference to Table 3 (e.g., a relatively larger MCS table with relatively fewer bits included in the DCI message).

The network entity 105-$a$ may determine whether to indicate, in the control signaling 215, to use $$\frac{\pi}{2}BPSK$$

modulation of QPSK modulation according to one or more communication parameters associated with the DFT-s-OFDM waveform 205, the UE 115-$a$, or both. For example, the network entity 105-$a$ may determine which modulation scheme to indicate according to a resource block allocation location associated with the DFT-s-OFDM waveform (e.g., $$\frac{\pi}{2}BPSK$$

modulation may be preferred for channel edge blocks and QPSK modulation may be preferred for inner channel blocks), a power class and power headroom of the UE 115-$a$, MPE and SAR constraints associated with the DFT-s-OFDM waveform 205, an SNR operating point associated with the UE 115-$a$, or any combination thereof, among other examples.

Additionally, or alternatively, the UE 115-$a$ may select between using $$\frac{\pi}{2}BPSK$$

modulation or QPSK modulation for the DFT-s-OFDM waveform 205 and may report the selection to the network entity 105-$a$. For example, the UE 115-$a$ may generate the DFT-s-OFDM waveform 205 for transmission during a scheduled PUSCH transmission occasion, and may select a modulation scheme as part of generating the DFT-s-OFDM waveform 205. The UE 115-$a$ may select between the $$\frac{\pi}{2}BPSK$$

modulation and the QPSK modulation according to the communication parameters associated with the DFT-s-OFDM waveform 205, the UE 115-*a*, or both. In some cases, the selection may be based on environmental factors of the UE 115-*a*. For example, if the environment of the UE 115-*a* enables transmission of a relatively high PAPR signal (e.g., a user's body tissue is proximate to an active antenna), the UE 115-*a* may select the QPSK modulation since PAPR reduction is not a primary concern. Alternatively, if the environment of the UE 115-*a* does not support a high PAPR signal, the UE 115-*a* may select the $$\frac{\pi}{2} BPSK$$

modulation to reduce the PAPR of the DFT-s-OFDM waveform 205. As another example, the UE 115-*a* may switch from using a first antenna port associated with a relatively higher power limit to a second antenna port associated with a relatively lower power limit. Such a switch may reduce an available power headroom of the UE 115-*a* (e.g., reducing a PAPR the UE 115-*a* is capable of supporting), and the UE 115-*a* may select the $$\frac{\pi}{2} BPSK$$

modulation to reduce the PAPR while using the second antenna.

In some examples, the UE 115-*a* may transmit control signaling, such as uplink control information (UCI) 220, to the network entity 105-*a* to indicate the selected modulation scheme. For example, the UE 115-*a* may multiplex the UCI 220 with the DFT-s-OFDM waveform 205 (e.g., signaled via protected resources of the PUSCH) to indicate the modulation information associated with the DFT-s-OFDM waveform 205.

Such techniques may improve communication performance by the UE 115-*a* by extending coding rates available for $$\frac{\pi}{2} BPSK$$

modulation and enabling dynamic switching between modulation schemes. By improving flexibility associated with modulating a DFT-s-OFDM waveform, signaling overhead, latency, and PAPR associated with communicating the DFT-s-OFDM waveform may be reduced, among other advantages.

Figure 3:
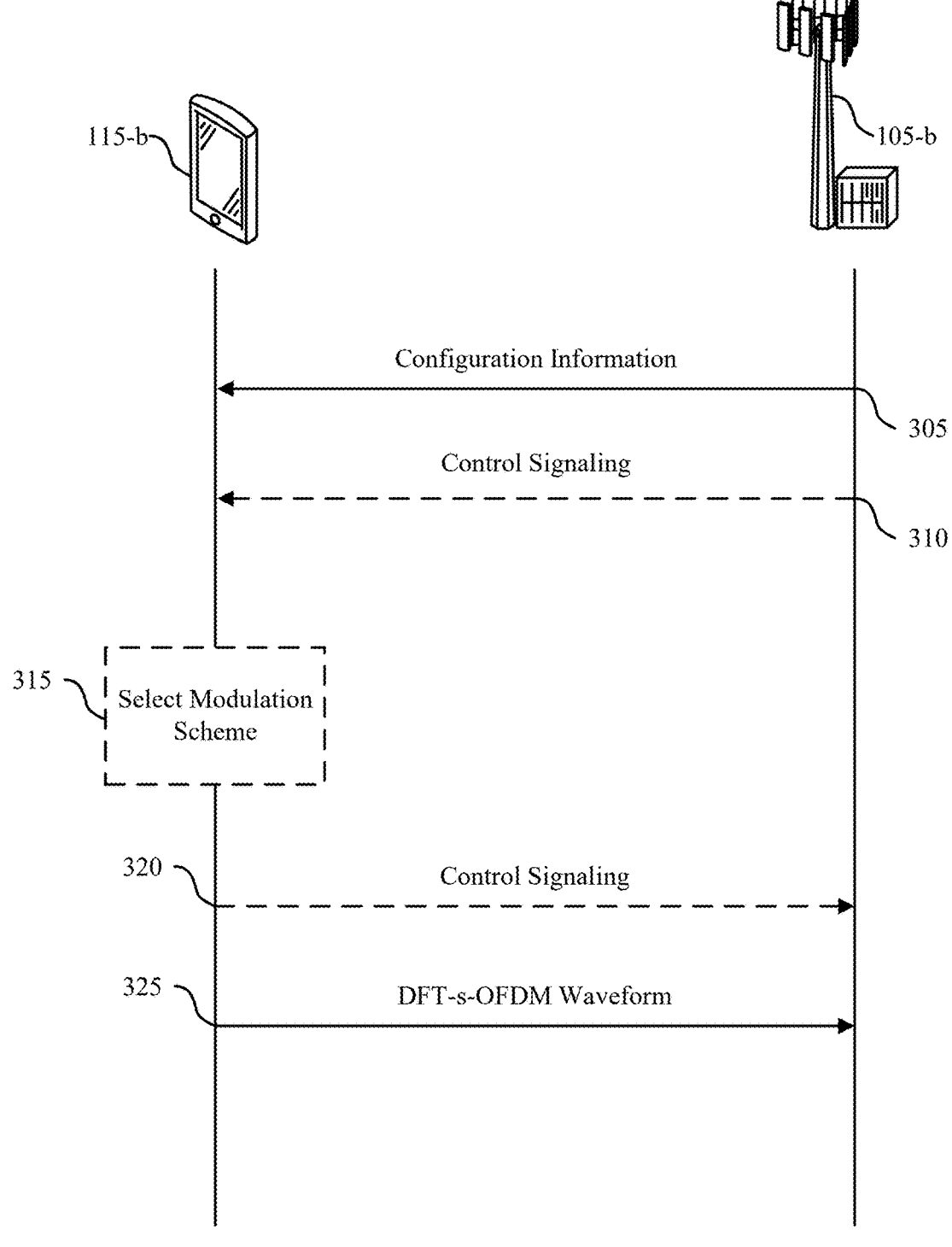
FIG. 3 shows an example of a process flow that supports configurable modulation schemes at a wireless device in accordance with one or more aspects of the present disclosure.

FIG. 3 shows an example of a process flow 300 that supports configurable modulation schemes at a wireless device in accordance with one or more aspects of the present disclosure. The process flow 300 may implement, or be implemented by, one or more aspects of the wireless communications systems 100 and 200. For example, the process flow 300 illustrates signaling and operations between a UE 115-*b* and a network entity 105-*b*, which may be examples of corresponding devices described with reference to FIGS. 1 and 2. In some examples, the process flow 300 may support the UE 115-*b* modulating a DFT-s-OFDM waveform according to $$\frac{\pi}{2} BPSK$$

modulation with extended coding rates, which may be an example of corresponding techniques described with reference to FIG. 2. Additionally, or alternatively, the process flow 300 may support the UE 115-*b* dynamically switching between using $$\frac{\pi}{2} BPSK$$

modulation for transmitting the DFT-s-OFDM waveforms, which may be examples of corresponding techniques described with reference to FIG. 2. Alternative examples of the following may be implemented, where some processes are performed in a different order than described or are not performed. In some cases, processes may include additional features not mentioned below, or further processes may be added.

At 305, the network entity 105-*b* may transmit, to the UE 115-*b*, configuration information indicating modulation information for transmitting a DFT-s-OFDM waveform. The configuration information may indicate a modulation $$\frac{\pi}{2} BPSK$$

modulation scheme and a first set of modulation orders corresponding to the $$\frac{\pi}{2} BPSK$$

modulation scheme and may indicate a QPSK modulation scheme and a second set of modulation orders corresponding to the QPSK modulation scheme. In some cases, the configuration information may include an MCS table, where the first set of modulation orders may be associated with a first set of indices of the MCS table and the second set of modulation orders may be associated with a second set of indices of the MCS table. In some examples, at least a portion of the second set of indices may overlap, within the MCS table, with the first set of indices (e.g., a portion of the MCS indices may support either $$\frac{\pi}{2} BPSK$$

modulation or QPSK modulation according to a q parameter). Alternatively, the first set of indices and the second set of indices may be separate indices within the MCS table (e.g., an MCS table with a larger size and indicating a single modulation scheme per MCS index).

At 310, the network entity 105-*b* may transmit, to the UE 115-*b*, control signaling indicating a modulation scheme to use for transmitting the DFT-s-OFDM waveform. For example, the control signaling may indicate for the UE 115-*b* to use the 27                                                          28

$$\frac{\pi}{2}BPSK$$

modulation scheme and a modulation order of the second set of modulation orders (e.g., a modulation order associated with an extended coding rate for $$\frac{\pi}{2}BPSK$$

modulation). In some cases, the control signaling may be a PUCCH transmission, such as a DCI message, which may reduce latency associated with indicating a modulation scheme. In some cases, such as when the portion of the second set of indices overlap with the first set of indices, the control signaling may indicate an MSC index and a q value to indicate which modulation scheme to use and the corresponding coding rate. Alternatively, such as when the first set of indices and the second set of indices are separate indices, the control signaling may include the MCS index without including the q value.

In some cases, the network entity 105-b may determine whether to use the $$\frac{\pi}{2}BPSK$$

modulation scheme or the QPSK modulation scheme based on one or more communication parameters associated with the DFT-s-OFDM waveform, the UE 115-b, or both. As described herein, the one or more communication parameters may include a resource block allocation location associated with the DFT-s-OFDM waveform, a power class of the UE 115-b, an available power headroom of the UE 115-b, an MPE threshold associated with the DFT-s-OFDM waveform, an SAR associated with the DFT-s-OFDM waveform, an SNR operating point associated with the UE 115-b, or any combination thereof.

At 315, the UE 115-b may select a modulation scheme for transmitting the DFT-s-OFDM waveform. For example, the UE 115-b may select to use the $$\frac{\pi}{2}BPSK$$

modulation scheme and the modulation order of the second set of modulation orders (e.g., an extended coding rate for $$\frac{\pi}{2}BPSK$$

modulation) for transmitting the DFT-s-OFDM waveform. The UE 115-b may select the $$\frac{\pi}{2}BPSK$$

modulation scheme (e.g., over the QPSK modulation scheme, or vice-versa) based on the one or more communication parameters associated with the DFT-s-OFDM waveform, the UE 115-b, or both (e.g., the communication parameters described at step 310 of the process flow 300). Additionally, or alternatively, the UE 115-b may select the modulation scheme according to one or more environmental factors associated with the UE 115-b (e.g., whether antenna power is influenced by the presence of a user's body tissue), an antenna selected for use by the UE 115-b, or both.

At 320, the UE 115-b may transmit control signaling to the network entity 105-b indicating the selected modulation scheme. For example, the control signaling may indicate the selection of the $$\frac{\pi}{2}BPSK$$

modulation scheme and the modulation order of the second set of modulation orders. In some examples, the control signaling may be an example of a UCI message. For example, the UE 115-b may transmit the control signaling via protected UCI resources of a PUSCH, and the UE 115-b may multiplex the UCI message with the DFT-s-OFDM waveform.

At 325, the UE 115-b may transmit the DFT-s-OFDM waveform to the network entity 105-b. For example, the UE 115-b may transmit the DFT-s-OFDM waveform in accordance with the $$\frac{\pi}{2}BPSK$$

modulation scheme and the modulation order of the second set of modulation orders. In some examples, a first coding rate associated with the modulation order of the second set of modulation orders may be higher than one or more second coding rates associated with the first set of modulation orders (e.g., the first coding rate may be an extended coding rate for $$\frac{\pi}{2}BPSK$$

modulation). In some examples, using the $$\frac{\pi}{2}BPSK$$

modulation and the modulation order of the second set of modulation orders may be based on the control signaling from the network entity 105-b (e.g., at 310), selection by the UE 115-b (e.g., at 315), or both. Alternatively, the UE 115-b may modulate the DFT-s-OFDM waveform according to QPSK modulation, such as when the network entity 105-b or the UE 115-b determines that QPSK modulation is preferred over $$\frac{\pi}{2}BPSK$$

modulation.

Such techniques may improve communication performance by the UE 115-b by extending coding rates available for $$\frac{\pi}{2} \, BPSK$$

modulation and enabling dynamic switching between modulation schemes. By improving flexibility associated with modulating a DFT-s-OFDM waveform, signaling overhead, latency, and PAPR associated with communicating the DFT-s-OFDM waveform may be reduced, among other advantages.

Figure 4:
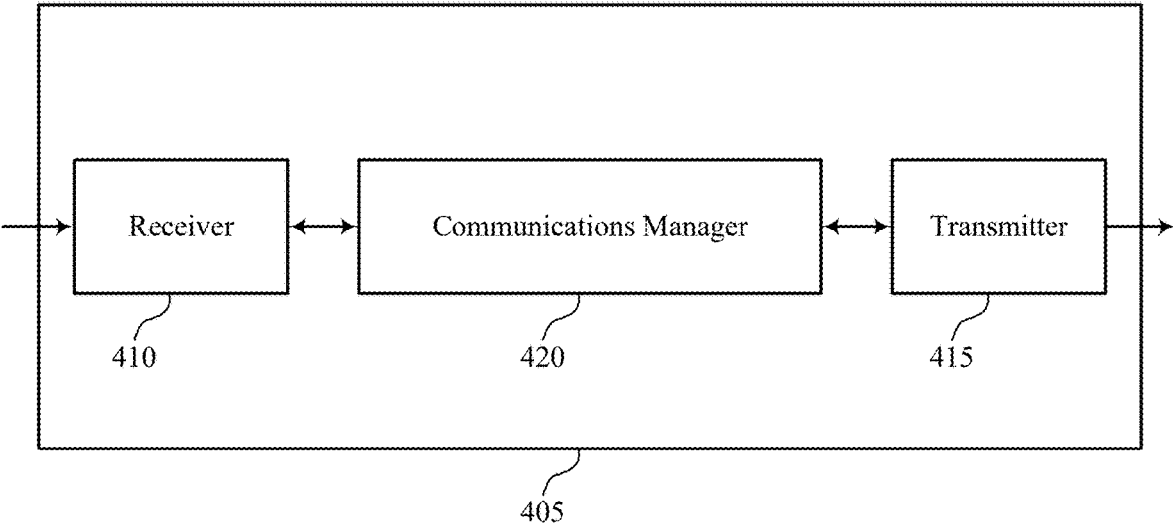
FIGS. 4 and 5 show block diagrams of devices that support configurable modulation schemes at a wireless device in accordance with one or more aspects of the present disclosure.

FIG. 4 shows a block diagram 400 of a device 405 that supports configurable modulation schemes at a wireless device in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to configurable modulation schemes at a wireless device). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to configurable modulation schemes at a wireless device). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations or components thereof may be examples of means for performing various aspects of configurable modulation schemes at a wireless device as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software) executed by at least one processor (e.g., referred to as a processor-executable code). If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for receiving configuration information indicating modulation information for transmitting a DFT-s-OFDM waveform to a network entity, the configuration information indicating a $$\frac{\pi}{2} \, BPSK$$

modulation scheme and a first set of modulation orders corresponding to the $$\frac{\pi}{2} \, BPSK$$

modulation scheme and indicating a QPSK modulation scheme and a second set of modulation orders corresponding to the QPSK modulation scheme. The communications manager 420 is capable of, configured to, or operable to support a means for transmitting the DFT-s-OFDM waveform to the network entity in accordance with the $$\frac{\pi}{2} \, BPSK$$

modulation scheme and a modulation order of the second set of modulation orders, where a first coding rate associated with the modulation order of the second set of modulation orders is higher than one or more second coding rates associated with the first set of modulation orders.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for reduced PAPR when communicating DFT-s-OFDM waveforms and improved resource utilization by improving flexibility when determining a modulation scheme for transmitting the DFT-s-OFDM waveforms.

Figure 5:
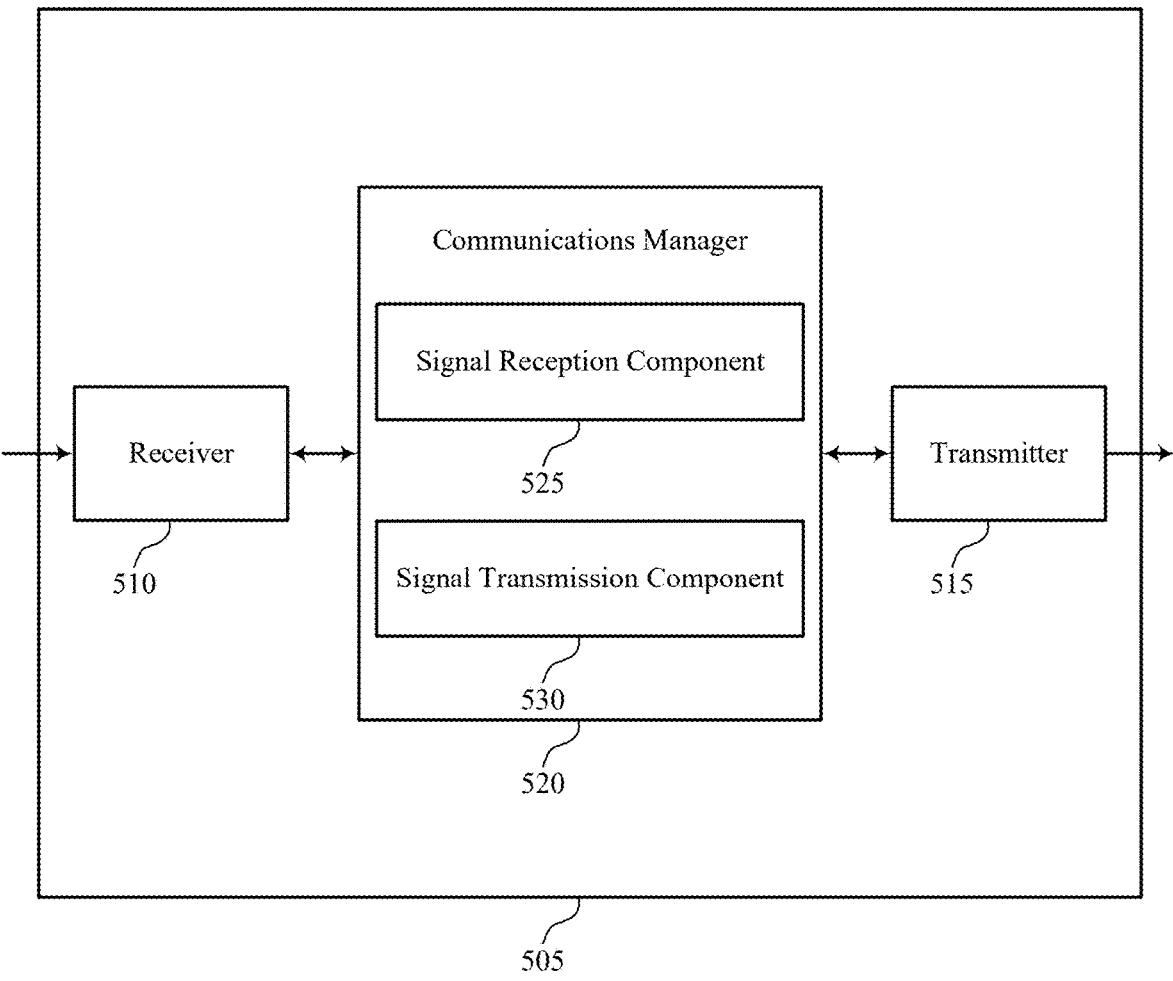

FIG. 5 shows a block diagram 500 of a device 505 that supports configurable modulation schemes at a wireless device in accordance with one or more aspects of the present disclosure. The device 505 may be an example of aspects of a device 405 or a UE 115 as described herein. The device 505 may include a receiver 510, a transmitter 515, and a communications manager 520. The device 505, or one of more components of the device 505 (e.g., the receiver 510, the transmitter 515, the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to configurable modulation schemes at a wireless device). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to configurable modulation schemes at a wireless device). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of configurable modulation schemes at a wireless device as described herein. For example, the communications manager 520 may include a signal reception component 525 a signal transmission component 530, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The signal reception component 525 is capable of, configured to, or operable to support a means for receiving configuration information indicating modulation information for transmitting a DFT-s-OFDM waveform to a network entity, the configuration information indicating a $$\frac{\pi}{2} BPSK$$

modulation scheme and a first set of modulation orders corresponding to the $$\frac{\pi}{2} BPSK$$

modulation scheme and indicating a QPSK modulation scheme and a second set of modulation orders corresponding to the QPSK modulation scheme. The signal transmission component 530 is capable of, configured to, or operable to support a means for transmitting the DFT-s-OFDM waveform to the network entity in accordance with the $$\frac{\pi}{2} BPSK$$

modulation scheme and a modulation order of the second set of modulation orders, where a first coding rate associated with the modulation order of the second set of modulation orders is higher than one or more second coding rates associated with the first set of modulation orders.

Figure 6:
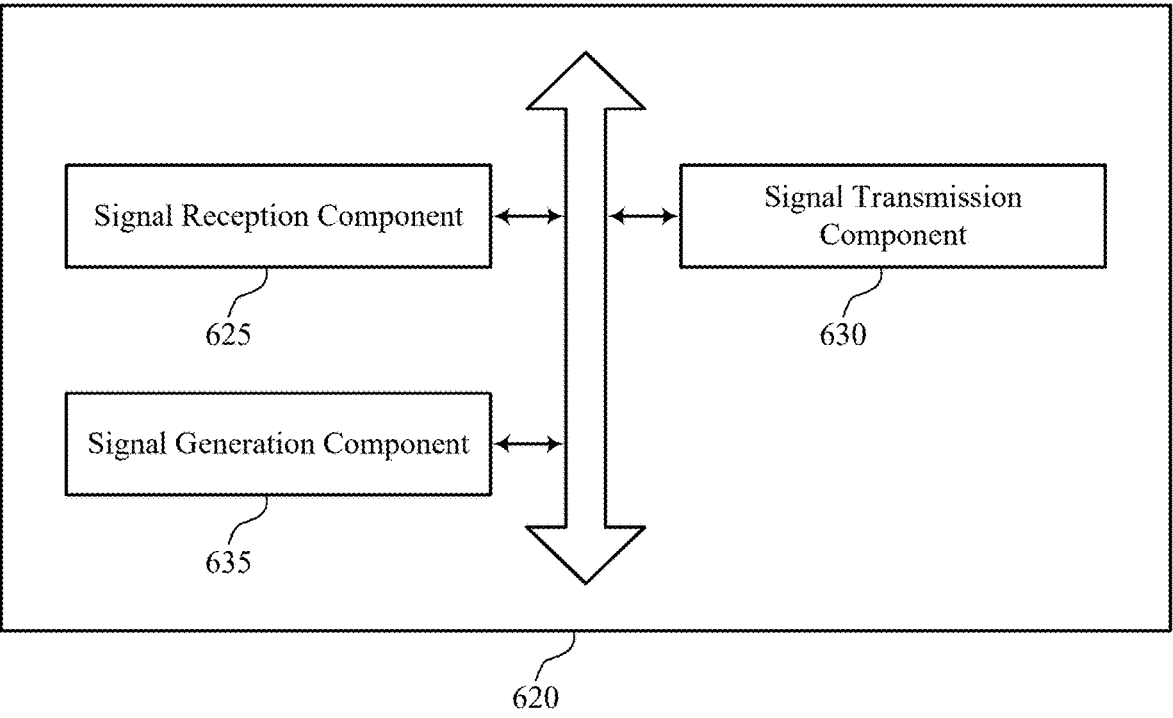
FIG. 6 shows a block diagram of a communications manager that supports configurable modulation schemes at a wireless device in accordance with one or more aspects of the present disclosure.

FIG. 6 shows a block diagram 600 of a communications manager 620 that supports configurable modulation schemes at a wireless device in accordance with one or more aspects of the present disclosure. The communications manager 620 may be an example of aspects of a communications manager 420, a communications manager 520, or both, as described herein. The communications manager 620, or various components thereof, may be an example of means for performing various aspects of configurable modulation schemes at a wireless device as described herein. For example, the communications manager 620 may include a signal reception component 625, a signal transmission component 630, a signal generation component 635, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The signal reception component 625 is capable of, configured to, or operable to support a means for receiving configuration information indicating modulation information for transmitting a DFT-s-OFDM waveform to a network entity, the configuration information indicating a $$\frac{\pi}{2} BPSK$$

modulation scheme and a first set of modulation orders corresponding to the $$\frac{\pi}{2} BPSK$$

modulation scheme and indicating a QPSK modulation scheme and a second set of modulation orders corresponding to the QPSK modulation scheme. The signal transmission component 630 is capable of, configured to, or operable to support a means for transmitting the DFT-s-OFDM waveform to the network entity in accordance with the $$\frac{\pi}{2} BPSK$$

modulation scheme and a modulation order of the second set of modulation orders, where a first coding rate associated with the modulation order of the second set of modulation orders is higher than one or more second coding rates associated with the first set of modulation orders.

In some examples, the configuration information includes a MCS table. In some examples, the first set of modulation orders are associated with a first set of indices of the MCS table and the second set of modulation orders are associated with a second set of indices of the MCS table.

In some examples, at least a portion of the second set of indices overlap, within the MCS table, with the first set of indices; or the first set of indices and the second set of indices include separate indices within the MCS table.

In some examples, the signal reception component 625 is capable of, configured to, or operable to support a means for receiving control signaling indicating to use the $$\frac{\pi}{2} BPSK$$

modulation scheme and the modulation order of the second set of modulation orders, where transmitting the DFT-s-OFDM waveform in accordance with the $$\frac{\pi}{2} BPSK$$

modulation scheme and the modulation order of the second set of modulation orders is based on receiving the control signaling.

In some examples, using the $$\frac{\pi}{2} BPSK$$

modulation scheme and the modulation order of the second set of modulation orders is based on one or more communication parameters associated with the DFT-s-OFDM waveform, the UE, or both.

In some examples, the one or more communication parameters include a resource block allocation location associated with the DFT-s-OFDM waveform, a power class of the UE, an available power headroom of the UE, a maximum permissible exposure threshold associated with the DFT-s-OFDM waveform, a specific absorption rate associated with the DFT-s-OFDM waveform, a signal-to-noise ratio operating point associated with the UE, or any combination thereof.

In some examples, the control signaling indicates a modulation order index associated with the modulation order, an indication of whether to use a coding rate of the modulation order that is associated with the $$\frac{\pi}{2} BPSK$$

modulation scheme, or both.

In some examples, the signal generation component 635 is capable of, configured to, or operable to support a means for selecting, by the UL, the $$\frac{\pi}{2} BPSK$$

modulation scheme and the modulation order of the second set of modulation orders to use for transmitting the DFT-s-OFDM waveform based on one or more communication parameters associated with the DFT-s-OFDM waveform, the UE, or both, where transmitting the DFT-s-OFDM waveform in accordance with the $$\frac{\pi}{2} BPSK$$

modulation scheme and the modulation order of the second set of modulation orders is based on the selection. In some examples, the signal transmission component 630 is capable of, configured to, or operable to support a means for transmitting, to the network entity, modulation scheme and the control signaling indicating the selection of the $$\frac{\pi}{2} BPSK$$

modulation scheme and the modulation order of the second set of modulation orders.

In some examples, the control signaling includes an uplink control information message that is multiplexed with the DFT-s-OFDM waveform.

Figure 7:
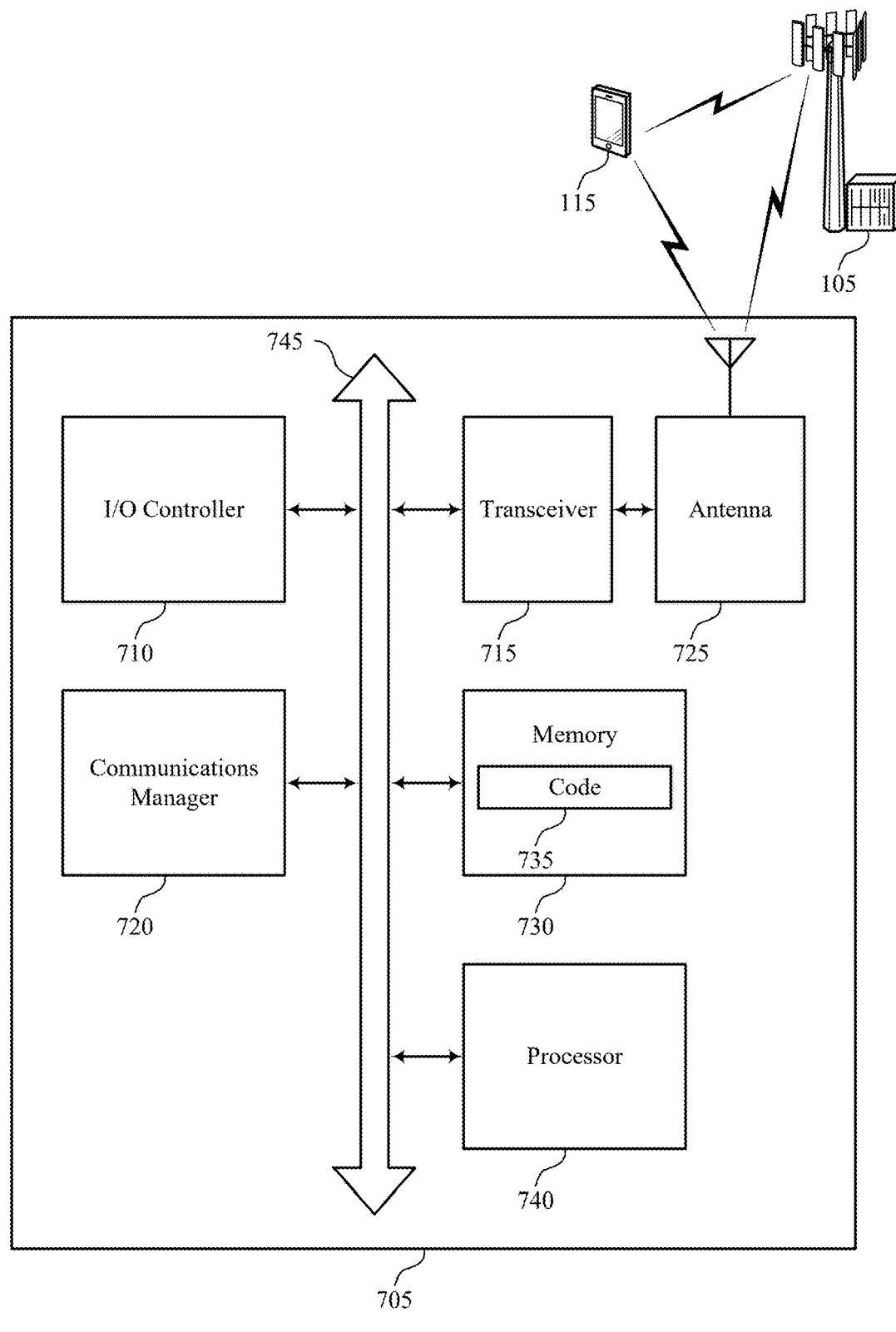
FIG. 7 shows a diagram of a system including a device that supports configurable modulation schemes at a wireless device in accordance with one or more aspects of the present disclosure.

FIG. 7 shows a diagram of a system 700 including a device 705 that supports configurable modulation schemes at a wireless device in accordance with one or more aspects of the present disclosure. The device 705 may be an example of or include components of a device 405, a device 505, or a UE 115 as described herein. The device 705 may communicate (e.g., wirelessly) with one or more other devices (e.g., network entities 105, UEs 115, or a combination thereof). The device 705 may include components for bi-directional voice and data communications including components for transmitting and receiving communications, such as a communications manager 720, an input/output (I/O) controller, such as an I/O controller 710, a transceiver 715, one or more antennas 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna. However, in some other cases, the device 705 may have more than one antenna, which may be capable of concurrently transmitting or receiving multiple wireless transmissions. The transceiver 715 may communicate bi-directionally via the one or more antennas 725 using wired or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable, or processor-executable code, such as the code 735. The code 735 may include instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may include, among other things, a basic I/O system (BIOS) which may control basic hardware or software operation such as the interaction with peripheral components or devices.

The at least one processor 740 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting configurable modulation schemes at a wireless device). For example, the device 705 or a component of the device 705 may include at least one processor 740 and at least one memory 730 coupled with or to the at least one processor 740, the at least one processor 740 and the at least one memory 730 configured to perform various functions described herein.

In some examples, the at least one processor 740 may include multiple processors and the at least one memory 730 may include multiple memories. One or more of the multiple processors may be coupled with one or more of the multiple memories, which may, individually or collectively, be configured to perform various functions described herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. For example, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code 735 (e.g., processor-executable code) stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for receiving configuration information indicating modulation information for transmitting a DFT-s-OFDM waveform to a network entity, the configuration information indicating a $$\frac{\pi}{2} BPSK$$

modulation scheme and a first set of modulation orders corresponding to the $$\frac{\pi}{2} BPSK$$

modulation scheme and indicating a QPSK modulation scheme and a second set of modulation orders corresponding to the QPSK modulation scheme. The communications manager 720 is capable of, configured to, or operable to support a means for transmitting the DFT-s-OFDM waveform to the network entity in accordance with the $$\frac{\pi}{2} BPSK$$

modulation scheme and a modulation order of the second set of modulation orders, where a first coding rate associated with the modulation order of the second set of modulation orders is higher than one or more second coding rates associated with the first set of modulation orders.

By including or configuring the communications manager 720 in accordance with examples as described herein, the device 705 may support techniques for reduced PAPR when communicating DFT-s-OFDM waveforms and improved resource utilization by improving flexibility when determining a modulation scheme for transmitting the DFT-s-OFDM waveforms.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of configurable modulation schemes at a wireless device as described herein, or the at least one processor 740 and the at least one memory 730 may be otherwise configured to, individually or collectively, perform or support such operations.

FIG. 8 shows a flowchart illustrating a method 800 that supports configurable modulation schemes at a wireless device in accordance with one or more aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include receiving configuration information indicating modulation information for transmitting a DFT-s-OFDM waveform to a network entity, the configuration information indicating a $$\frac{\pi}{2} BPSK$$

modulation scheme and a first set of modulation orders corresponding to the $$\frac{\pi}{2} BPSK$$

modulation scheme and indicating a QPSK modulation scheme and a second set of modulation orders corresponding to the QPSK modulation scheme. The operations of 805 may be performed in accordance with examples as disclosed herein. In some examples, aspects of the operations of 805 may be performed by a signal reception component 625 as described with reference to FIG. 6.

At 810, the method may include transmitting the DFT-s-OFDM waveform to the network entity in accordance with the $$\frac{\pi}{2} BPSK$$

modulation scheme and a modulation order of the second set of modulation orders, where a first coding rate associated with the modulation order of the second set of modulation orders is higher than one or more second coding rates associated with the first set of modulation orders. The operations of 810 may be performed in accordance with examples as disclosed herein. In some examples, aspects of the operations of 810 may be performed by a signal transmission component 630 as described with reference to FIG. 6.

The following provides an overview of aspects of the present disclosure:

Aspect 1: A method for wireless communications at a UE, comprising: receiving configuration information indicating modulation information for transmitting a DFT-s-OFDM waveform to a network entity, the configuration information indicating π/2 BPSK modulation scheme and a first set of modulation orders corresponding to the π/2 BPSK modulation scheme and indicating a quadrature phase shift keying QPSK modulation scheme and a second set of modulation orders corresponding to the QPSK modulation scheme; and transmitting the DFT-s-OFDM waveform to the network entity in accordance with the π/2 BPSK modulation scheme and a modulation order of the second set of modulation orders, wherein a first coding rate associated with the modulation order of the second set of modulation orders is higher than one or more second coding rates associated with the first set of modulation orders.

Aspect 2: The method of aspect 1, wherein the configuration information comprises a MCS table, and the first set of modulation orders are associated with a first set of indices of the MCS table and the second set of modulation orders are associated with a second set of indices of the MCS table.

Aspect 3: The method of aspect 2, wherein at least a portion of the second set of indices overlap, within the MCS table, with the first set of indices; or the first set of indices and the second set of indices comprise separate indices within the MCS table.

Aspect 4: The method of any of aspects 1 through 3, further comprising: receiving control signaling indicating to use the π/2 BPSK modulation scheme and the modulation order of the second set of modulation orders, wherein transmitting the DFT-s-OFDM waveform in accordance with the π/2 BPSK modulation scheme and the modulation order of the second set of modulation orders is based at least in part on receiving the control signaling.

Aspect 5: The method of aspect 4, wherein using the π/2 BPSK modulation scheme and the modulation order of the second set of modulation orders is based at least in part on one or more communication parameters associated with the DTF-s-OFDM waveform, the UE, or both.

Aspect 6: The method of aspect 5, wherein the one or more communication parameters comprise a resource block allocation location associated with the DTF-s-OFDM waveform, a power class of the UE, an available power headroom of the UE, a maximum permissible exposure threshold associated with the DTF-s-OFDM waveform, a specific absorption rate associated with the DTF-s-OFDM waveform, a signal-to-noise ratio operating point associated with the UE, or any combination thereof.

Aspect 7: The method of any of aspects 4 through 6, wherein the control signaling indicates a modulation order index associated with the modulation order, an indication of whether to use a coding rate of the modulation order that is associated with the π/2 BPSK modulation scheme, or both.

Aspect 8: The method of any of aspects 1 through 3, further comprising: selecting, by the UE, the π/2 BPSK modulation scheme and the modulation order of the second set of modulation orders to use for transmitting the DTF-s-OFDM waveform based at least in part on one or more communication parameters associated with the DFT-s-

OFDM waveform, the UE, or both, wherein transmitting the DFT-s-OFDM waveform in accordance with the $\pi/2$ BPSK modulation scheme and the modulation order of the second set of modulation orders is based at least in part on the selection; and transmitting, to the network entity, control signaling indicating the selection of the $\pi/2$ BPSK modulation scheme and the modulation order of the second set of modulation orders.

Aspect 9: The method of aspect 8, wherein the control signaling comprises an uplink control information message that is multiplexed with the DFT-s-OFDM waveform.

Aspect 10: A UE for wireless communications, comprising one or more memories storing processor-executable code, and one or more processors coupled with the one or more memories and individually or collectively operable to execute the code to cause the UE to perform a method of any of aspects 1 through 9.

Aspect 11: A UE for wireless communications, comprising at least one means for performing a method of any of aspects 1 through 9.

Aspect 12: A non-transitory computer-readable medium storing code for wireless communications, the code comprising instructions executable by one or more processors to perform a method of any of aspects 1 through 9.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
   one or more memories storing processor-executable code; and
   one or more processors coupled with the one or more memories and individually or collectively operable to execute the code to cause the UE to:
      receive configuration information indicating modulation information for transmitting a discrete Fourier transform-spread-orthogonal frequency division multiplexing (DFT-s-OFDM) waveform to a network entity, the configuration information indicating a $$\frac{\pi}{2}$$

binary phase shift keying (BPSK) modulation scheme and a first set of modulation orders corresponding to the $$\frac{\pi}{2} BPSK$$

modulation scheme and the configuration information indicating a quadrature phase shift keying (QPSK) modulation scheme and a second set of modulation orders corresponding to the QPSK modulation scheme; and
      transmit the DFT-s-OFDM waveform to the network entity in accordance with the $$\frac{\pi}{2} BPSK$$

modulation scheme and a modulation order of the second set of modulation orders, wherein a first coding rate associated with the modulation order of the second set of modulation orders is higher than one or more second coding rates associated with the first set of modulation orders.

2. The UE of claim 1, wherein the configuration information comprises a modulation and coding scheme table, and wherein the first set of modulation orders are associated with a first set of indices of the modulation and coding scheme table and the second set of modulation orders are associated with a second set of indices of the modulation and coding scheme table.

3. The UE of claim 2, wherein:
   at least a portion of the second set of indices overlap, within the modulation and coding scheme table, with the first set of indices; or
   the first set of indices and the second set of indices comprise separate indices within the modulation and coding scheme table.

4. The UE of claim 1, wherein the one or more processors are individually or collectively further operable to execute the code to cause the UE to:

receive control signaling indicating to utilize the $$\frac{\pi}{2} BPSK$$

modulation scheme and the modulation order of the second set of modulation orders, wherein transmitting the DFT-s-OFDM waveform in accordance with the $$\frac{\pi}{2} BPSK$$

modulation scheme and the modulation order of the second set of modulation orders is based at least in part on receiving the control signaling.

5. The UE of claim 4, wherein utilizing the $$\frac{\pi}{2} BPSK$$

modulation scheme and the modulation order of the second set of modulation orders is based at least in part on one or more communication parameters associated with the DFT-s-OFDM waveform, the UE, or both.

6. The UE of claim 5, wherein the one or more communication parameters comprise a resource block allocation location associated with the DFT-s-OFDM waveform, a power class of the UE, an available power headroom of the UE, a maximum permissible exposure threshold associated with the DFT-s-OFDM waveform, a specific absorption rate associated with the DFT-s-OFDM waveform, a signal-to-noise ratio operating point associated with the UE, or any combination thereof.

7. The UE of claim 4, wherein the control signaling indicates a modulation order index associated with the modulation order of the second set of modulation orders, an indication of whether to utilize a coding rate of the modulation order that is associated with the $$\frac{\pi}{2} BPSK$$

modulation scheme, or both.

8. The UE of claim 1, wherein the one or more processors are individually or collectively further operable to execute the code to cause the UE to:

select, by the UE, the $$\frac{\pi}{2} BPSK$$

modulation scheme and the modulation order of the second set of modulation orders to utilize for transmitting the DFT-s-OFDM waveform based at least in part on one or more communication parameters associated with the DFT-s-OFDM waveform, the UE, or both, wherein transmitting the DFT-s-OFDM waveform in accordance with the $$\frac{\pi}{2} BPSK$$

modulation scheme and the modulation order of the second set of modulation orders is based at least in part on the selection; and transmit, to the network entity, control signaling indicating the selection of the $$\frac{\pi}{2} BPSK$$

modulation scheme and the modulation order of the second set of modulation orders.

9. The UE of claim 8, wherein the control signaling comprises an uplink control information message that is multiplexed with the DFT-s-OFDM waveform.

10. A method for wireless communications at a user equipment (UE), the method comprising:

receiving configuration information indicating modulation information for transmitting a discrete Fourier transform-spread-orthogonal frequency division multiplexing (DFT-s-OFDM) waveform to a network entity, the configuration information indicating a $$\frac{\pi}{2}$$

binary phase shift keying (BPSK) modulation scheme and a first set of modulation orders corresponding to the $$\frac{\pi}{2} BPSK$$

modulation scheme and the configuration information indicating a quadrature phase shift keying (QPSK) modulation scheme and a second set of modulation orders corresponding to the QPSK modulation scheme; and transmitting the DFT-s-OFDM waveform to the network entity in accordance with the $$\frac{\pi}{2} BPSK$$

modulation scheme and a modulation order of the second set of modulation orders, wherein a first coding rate associated with the modulation order of the second set of modulation orders is higher than one or more second coding rates associated with the first set of modulation orders.

11. The method of claim 10, wherein the configuration information comprises a modulation and coding scheme table, and wherein the first set of modulation orders are associated with a first set of indices of the modulation and coding scheme table and the second set of modulation orders are associated with a second set of indices of the modulation and coding scheme table.

12. The method of claim 11, wherein:

at least a portion of the second set of indices overlap, within the modulation and coding scheme table, with the first set of indices; or the first set of indices and the second set of indices comprise separate indices within the modulation and coding scheme table.

13. The method of claim 10, further comprising:
receiving control signaling indicating to utilize the $$\frac{\pi}{2} BPSK$$

modulation scheme and the modulation order of the second set of modulation orders, wherein transmitting the DFT-s-OFDM waveform in accordance with the $$\frac{\pi}{2} BPSK$$

modulation scheme and the modulation order of the second set of modulation orders is based at least in part on receiving the control signaling.

14. The method of claim 13, wherein utilizing the $$\frac{\pi}{2} BPSK$$

modulation scheme and the modulation order of the second set of modulation orders is based at least in part on one or more communication parameters associated with the DFT-s-OFDM waveform, the UE, or both.

15. The method of claim 14, wherein the one or more communication parameters comprise a resource block allocation location associated with the DFT-s-OFDM waveform, a power class of the UE, an available power headroom of the UE, a maximum permissible exposure threshold associated with the DFT-s-OFDM waveform, a specific absorption rate associated with the DFT-s-OFDM waveform, a signal-to-noise ratio operating point associated with the UE, or any combination thereof.

16. The method of claim 13, wherein the control signaling indicates a modulation order index associated with the modulation order of the second set of modulation orders, an indication of whether to utilize a coding rate of the modulation order that is associated with the $$\frac{\pi}{2} BPSK$$

modulation scheme, or both.

17. The method of claim 10, further comprising:
selecting, by the UE, the $$\frac{\pi}{2} BPSK$$

modulation scheme and the modulation order of the second set of modulation orders to utilize for transmitting the DFT-s-OFDM waveform based at least in part on one or more communication parameters associated with the DFT-s-OFDM waveform, the UE, or both, wherein transmitting the DFT-s-OFDM waveform in accordance with the $$\frac{\pi}{2} BPSK$$

modulation scheme and the modulation order of the second set of modulation orders is based at least in part on the selection; and transmitting, to the network entity, control signaling indicating the selection of the $$\frac{\pi}{2} BPSK$$

modulation scheme and the modulation order of the second set of modulation orders.

18. The method of claim 17, wherein the control signaling comprises an uplink control information message that is multiplexed with the DFT-s-OFDM waveform.

19. A non-transitory computer-readable medium storing code for wireless communications, the code comprising instructions executable by at least one processor to:
receive configuration information indicating modulation information for transmitting a discrete Fourier transform-spread-orthogonal frequency division multiplexing (DFT-s-OFDM) waveform to a network entity, the configuration information indicating a $$\frac{\pi}{2}$$

binary phase shift keying (BPSK) modulation scheme and a first set of modulation orders corresponding to the $$\frac{\pi}{2} BPSK$$

modulation scheme and the configuration information indicating a quadrature phase shift keying (QPSK) modulation scheme and a second set of modulation orders corresponding to the QPSK modulation scheme; and
transmit the DFT-s-OFDM waveform to the network entity in accordance with the $$\frac{\pi}{2} BPSK$$

modulation scheme and a modulation order of the second set of modulation orders, wherein a first coding rate associated with the modulation order of the second set of modulation orders is higher than one or more second coding rates associated with the first set of modulation orders.

20. The non-transitory computer-readable medium of claim 19, wherein the configuration information comprises a modulation and coding scheme table, and wherein the first set of modulation orders are associated with a first set of indices of the modulation and coding scheme table and the second set of modulation orders are associated with a second set of indices of the modulation and coding scheme table.

* * * * *